(12) United States Patent
Barrett et al.

(10) Patent No.: US 8,807,533 B2
(45) Date of Patent: Aug. 19, 2014

(54) TOOL AND METHOD FOR INSTALLING CABLE INTO MOLDING

(75) Inventors: Louis Alexander Barrett, Conover, NC (US); Gerry Jay Harvey, Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 439 days.

(21) Appl. No.: 13/234,465

(22) Filed: Sep. 16, 2011

(65) Prior Publication Data
US 2012/0007030 A1 Jan. 12, 2012

Related U.S. Application Data

(63) Continuation of application No. PCT/US2010/027578, filed on Mar. 17, 2010.

(60) Provisional application No. 61/160,899, filed on Mar. 17, 2009.

(51) Int. Cl.
*H02G 1/06* (2006.01)
*H02G 1/08* (2006.01)

(52) U.S. Cl.
CPC ..................................... *H02G 1/085* (2013.01)
USPC ........................... 254/134.3 R; 254/134.3 FT

(58) Field of Classification Search
USPC ......... 254/134, 3 R, 134.3 FT; 72/462, 401.1, 72/459, 31.05, 458
See application file for complete search history.

(56) References Cited

U.S. PATENT DOCUMENTS

| | | | | |
|---|---|---|---|---|
| 4,196,610 A * | 4/1980 | Chilton | ........................... | 72/459 |
| 5,523,529 A | 6/1996 | Holliday | ....................... | 174/101 |
| 6,655,014 B1 | 12/2003 | Babini | ........................... | 29/755 |
| 6,739,581 B1 | 5/2004 | Carlson | .................. | 254/134.3 R |
| 6,820,457 B2 * | 11/2004 | Luebke et al. | .................. | 72/459 |
| 6,834,527 B2 * | 12/2004 | Hopwood | ....................... | 72/459 |
| 6,915,549 B2 | 7/2005 | Forsberg et al. | ................. | 29/278 |
| 2003/0233859 A1 * | 12/2003 | Luebke et al. | .................. | 72/458 |
| 2004/0182129 A1 * | 9/2004 | Hopwood | ....................... | 72/459 |
| 2009/0223267 A1 * | 9/2009 | King | .......................... | 72/31.05 |
| 2011/0000273 A1 * | 1/2011 | Latoria | ........................... | 72/459 |
| 2012/0007030 A1 * | 1/2012 | Barrett et al. | .......... | 254/134.3 R |
| 2012/0240655 A1 * | 9/2012 | Houle et al. | .................... | 72/476 |

* cited by examiner

Primary Examiner — Lee D Wilson
(74) Attorney, Agent, or Firm — C. Keith Montgomery

(57) ABSTRACT

A tool and a method for installing one or more cables into a molding is disclosed. The tool includes a laying chute on a first end of the tool having an open passage along its length for inserting one or more cables into the laying chute. The tool also includes one or more closing devices that are rotatably attached to the laying chute to allow insertion of the one or more cables into the laying chute. The cable is inserted into the laying chute and secured using the closing devices. Thereafter, the tool is moved along the length of the molding for inserting the cable therein.

5 Claims, 16 Drawing Sheets

TOOL AND METHOD FOR INSTALLING CABLE INTO MOLDING

PRIORITY APPLICATION

This application is a continuation of International Application No. PCT/US10/27578 filed Mar. 17, 2010, which claims the benefit of priority to U.S. Application No. 61/160,899, filed Mar. 17, 2009, both applications being incorporated herein by reference.

BACKGROUND

The disclosure is directed to an installation tool and method for using the installation tool for installing cables and/or cable assemblies. For instance, the installation tool is useful for installing a horizontal cable bundle into a duct system such as a latch duct molding systems used in multiple dwelling units (MDUs).

Optical fiber is increasingly being used for a variety of applications in for broadband voice, video, data transmission, and the like. Benefits of optical fiber use include extremely wide bandwidth and low noise operation. With the increasing and varied use of optical fibers, it is important to provide efficient methods of installing and configuring optical fiber pathways into the designated spaces. This is especially true when routing optical fibers toward the subscriber which presents new challenges to the craft. The MDU space is especially challenging since it requires routing optical fiber to multiple subscribers along common spaces of a multitude of different types of buildings.

The demand for bandwith is driving service providers to route optical fiber toward subscribers in multiple dwelling units (MDUs) such as apartment buildings, condos, and the like. Several different factors are important for routing the optical fiber in the MDU space such as ease of installation, speed of installation and aesthetics. A typical MDU installation places cables into a molding system to concealing the cables running in the common space of the MDU. By way of example, one common type of molding system is a latch duct molding systems that are typically run along common hallways of MDUs in an overhead location. Placing the molding systems in an overhead location inhibits tampering and makes the molding appear decorative. However, running conventional molding in overhead locations has drawbacks for installing the same. For instance, the molding systems in overhead locations requires that technician(s) use a step ladder to reach the same and then multiple ups and downs trips on the ladder along the pathway in order to open the molding, place the cable inside and then close the system. Thus, the installation procedure is time consuming.

SUMMARY

The disclosed tool allows for the craft to open the molding and then guide the cable and/or cable assembly into the molding systems in a quick, easy, and reliable manner. For instance, the tool is useful for installing a horizontal bundle product (i.e., one or more cables) on a small payoff reel into the molding quickly and easily without the use of a ladder. The tool can also be used for completing the installation by re-latching the molding into the closed position. Additionally, methods of using the tool are disclosed.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character as it is claimed. The accompanying drawings are included to provide a further understanding, and are incorporated into and constitute a part of this specification. The drawings illustrate various embodiments, and together with the description serve to explain the principles and operation.

DETAILED DESCRIPTION OF THE PREFERRED EMBODIMENTS

Reference will now be made in detail to the preferred embodiments, examples of which are illustrated in the accompanying drawings. Whenever possible, like reference numbers will be used to refer to like components or parts. Embodiments described herein are explanatory methods and devices for preparing and/or terminating an end portion of a fiber optic cable. Moreover, the concepts disclosed advantageously allow for easily repeatable and reliable terminations by the craft. Reference will now be made in detail to the preferred embodiments, examples of which are illustrated in the accompanying drawings. Whenever possible, like reference numbers will be used to refer to like components or parts.

Figure 1:
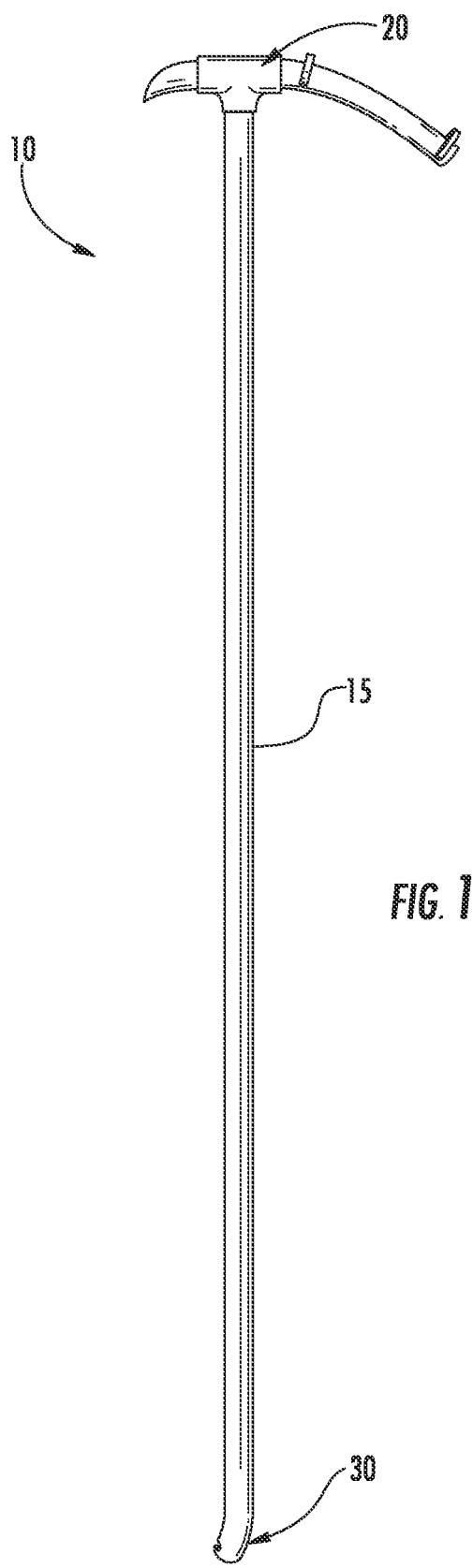
FIG. 1 shows a perspective view of an explanatory tool for placing a cable or cable assembly into a molding.

FIG. 1 is a perspective view of an explanatory tool 10 for installing one or more cables such as cable bundles and/or cables assemblies into a molding that routes the same. By way of example, the molding is used as a pathway for routing and hides the cable(s) for aesthetic purposes. For instance, the molding may be used along a common space in a building such as a hallway of a multiple dwelling unit (MDU) or other suitable location such as a commercial building or the like. Tool 10 is used by the craft for placing the cable, cable assembly or the like into the molding in a quick and efficient manner. As used herein, "cable" means one or more cables, cable assemblies, bundles of cables, loose fibers, and/or micromodules. As shown, tool 10 has a first end 20 (i.e., a proximate end) and a second end 30 (i.e., a distal end) connected by a handle 15 that can be any suitable length. In other embodiments, handle 15 may be constructed so that it telescopes for adjusting the length of the tool. Second end 30 is used for placing the cable or cable assembly into the molding and first end 20 may have a structure used for opening and/or closing the molding structure.

Figure 2:
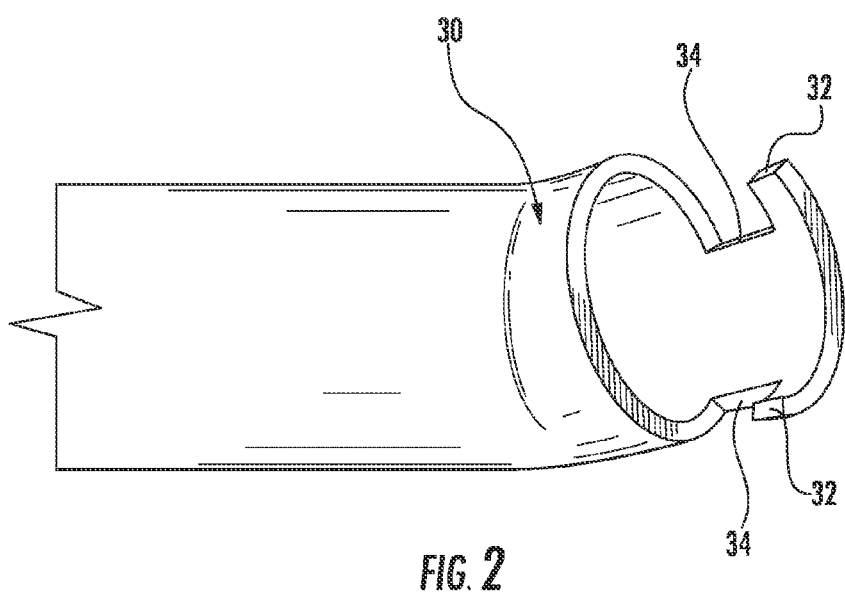
FIGS. 2-5 show detailed views of the first and second ends of the tool of FIG. 1.
Figure 3:
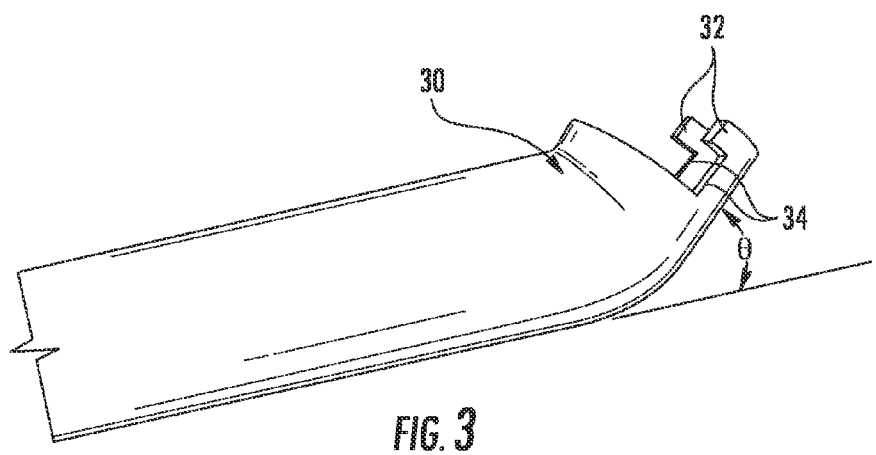
Figure 4:
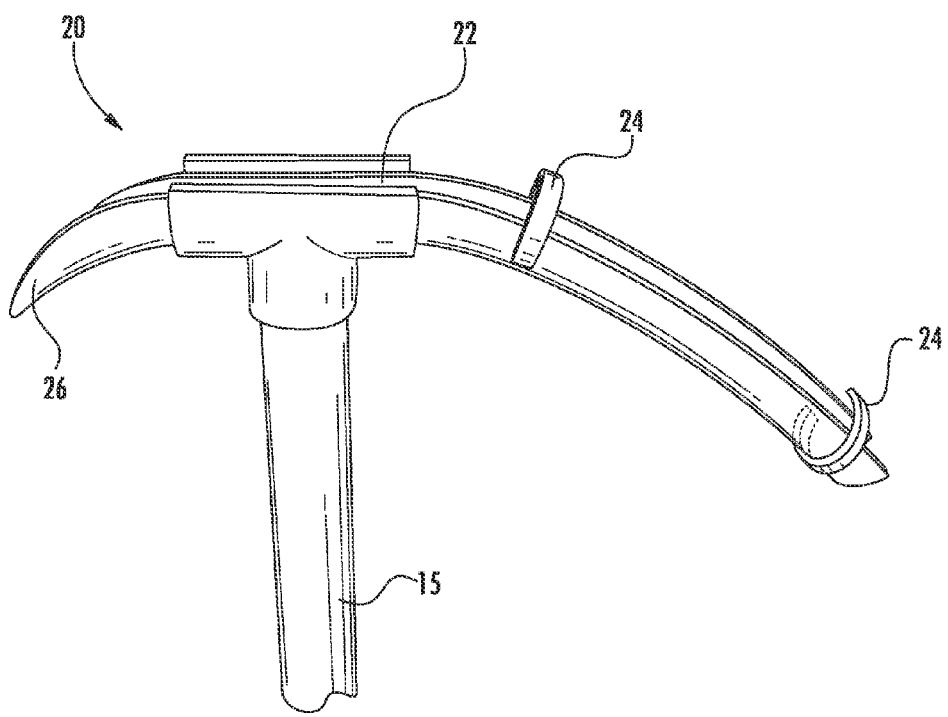
Figure 5:
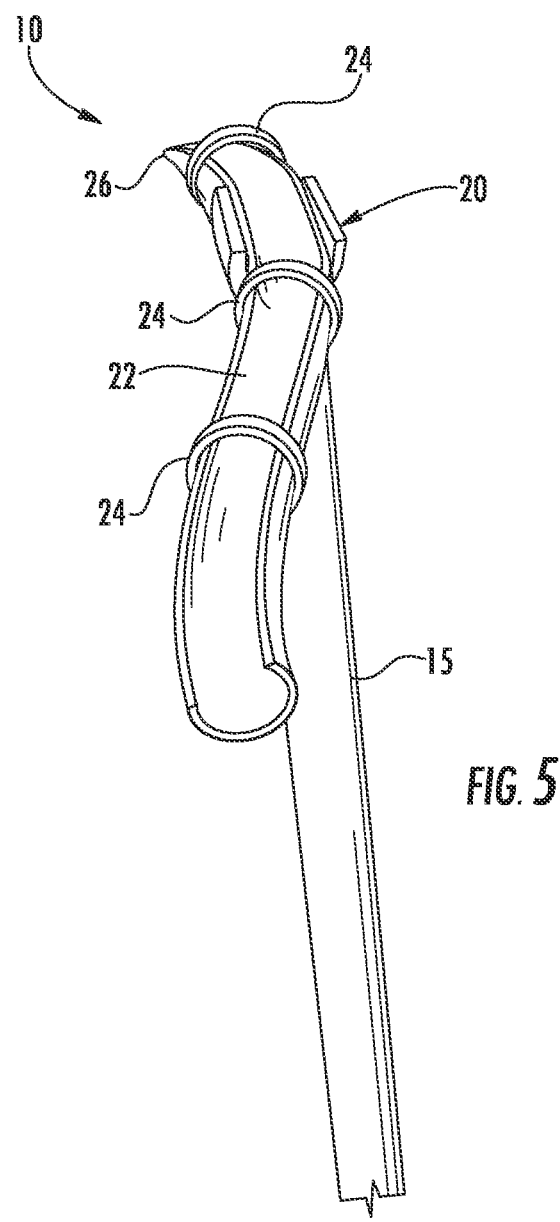

FIGS. 2-5 depict detailed views of the respective ends of tool 10. Specifically, FIGS. 2 and 3 show detailed views of the second end 30 of tool 10 and FIGS. 4 and 5 show views of the first end 20 of tool 10. As best shown in FIGS. 2 and 3, second end 30 includes one or more tabs 32 that may be used for opening a portion of the molding before placing the cable or cable assembly therein. Additionally, second end 30 may optionally include one or more slots 34 adjacent to the tabs, thereby allowing tabs 32 to reach further when grabbing and opening a portion of the molding. First end 20 may be positioned at a suitable angle θ relative to a longitudinal axis of handle 15 so that craft can stand at a suitable distance from the wall supporting the molding 50 and easily grab the desired portion of the same.

FIGS. 4 and 5 depict the first end 20 of tool 10 and shows laying chute 22 having a trough or open passage (not numbered) along its length for inserting the cable therein. As best shown in FIG. 5, laying chute 22 may have one or more curved portions such as a bow to help guide the cable therethrough. Laying chute 22 has one or more closing devices 24 such as rings or partial rings rotatably attached thereto for aiding in placing and holding of the cable in the trough of laying chute 22. By way of example, the closing devices 24 may be rotated to an open position to allow the insertion of a portion of the cable into the trough and then closing devices 24 are rotated to a closed position to inhibit the one or more cables from leaving laying chute 22 when guiding the cable into the molding. Simply stated, rotating closing devices 24 to the open position allows loading of the cable or cable assembly into the tool by the craft and rotating closing devices 24 to the closed position secures the cable or cable assembly within the laying chute 22 of tool 10. Tools may include suitable numbers of closing devices 24 such as two or more located at suitable locations along the laying chute 22. Moreover, closing devices 24 may be movable along laying chute 22 or have designated locations on laying chute 22 about which they rotate.

During use the cable will enter the laying chute 22 and then the tool 10 is inserted into the molding while moving tool 10 down the hallway for placing the cable into the molding. More specifically, a snout 26 of first end 20 of tool 10 is used for opening/spreading apart the molding and guiding the cable into the molding as discussed herein. As shown, snout 26 has a tapered end for aiding in opening and spreading apart the molding and transitioning between seams in molding 50; however, snout 26 may have any suitable shape. In other embodiments of the tool, the laying chute can be reversed so that snout 26 is disposed on the other side of handle 15 (i.e., a mirror image) so that the cable is placed using the other side of the tool.

Tool 10 may be formed of any suitable materials such as plastic, metal, wood, or combinations thereof for durability and/or ease of manufacturing. For instance, a tool maybe formed from PVC components. Additionally, the tool may be formed from one or more sections that may provide further functionality for the same such as extending the reach of the tool. Illustratively, handle 15 of tool 10 may have an adjustable length such as a telescoping feature (i.e., two portions that translate and lock together at different positions) for adjusting the reach of tool 10. In other embodiments, the tool has one or more ends that are removable and replaceable on the handle so that handles of varying lengths can be attached to the tool or different ends may be attached to the handle.

Figure 6:
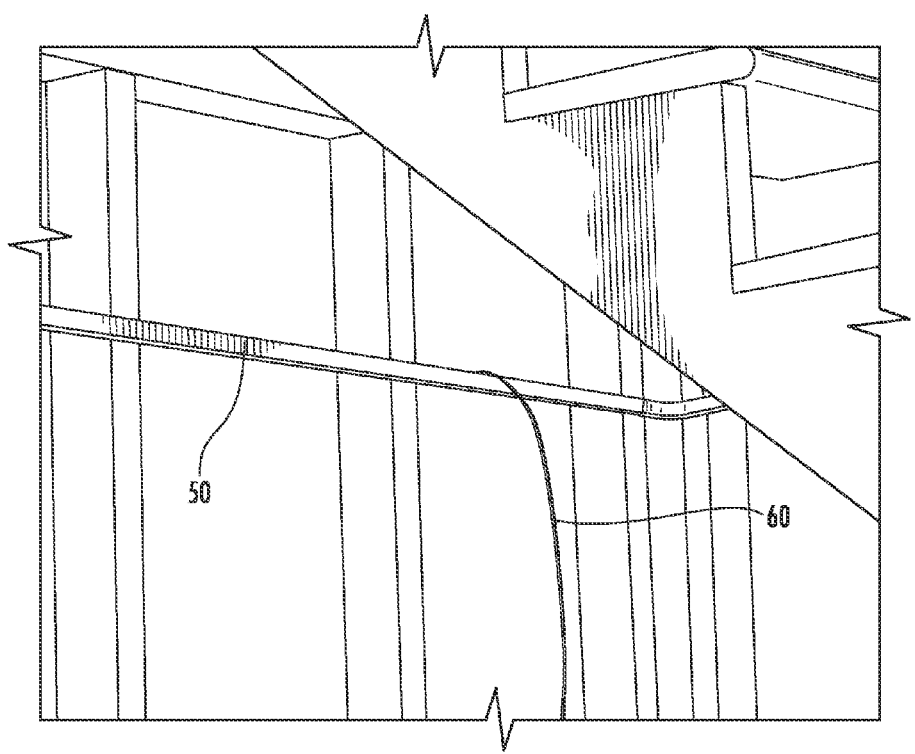
FIG. 6 depicts how the craft manually places a bundled cable assembly into horizontal molding.

FIG. 6 shows a typical molding 50 having a cable 60 routed therein using a conventional installation method. Specifically, FIG. 6 depicts an explanatory construction structure showing a framed-in wall behind a staircase having molding 50 mounted thereto. In other constructions, molding 50 may be secured to a finished wall such as near the ceiling in an MDU or any other suitable location. As shown, molding 50 is mounted horizontally along the length of the wall at a given height and has cable 60 partially installed therein using a conventional installation method. The conventional installation of the cable into molding 50 first requires the craft to manually open the molding 50 along its length for placement of the cable therein. Thereafter, the craft can install cable 60 along its length and then close the molding 50 with the cable 60 hidden therein. Difficulties can arise during conventional installations. Moreover, when the molding 50 is located in overhead locations these difficulties can be compounded since the craft is typically using a ladder to access the molding 50.

For instance, the molding 50 typically has one-side that has a living hinge and a second side with a snap-fit closing structure that is difficult to keep in the open position while placing cable therein since it wants to spring back to the closed position. Moreover, the conventional installation method requires the craft to work the length of the molding while inserting the cable into the same, which often requires two or more people to manipulate the molding and feed the cable therein, especially when the molding is mounted in an overhead location. Thus, it can become time-consuming and cumbersome for the craft to install cable into molding 50 using conventional installation techniques.

Figure 7:
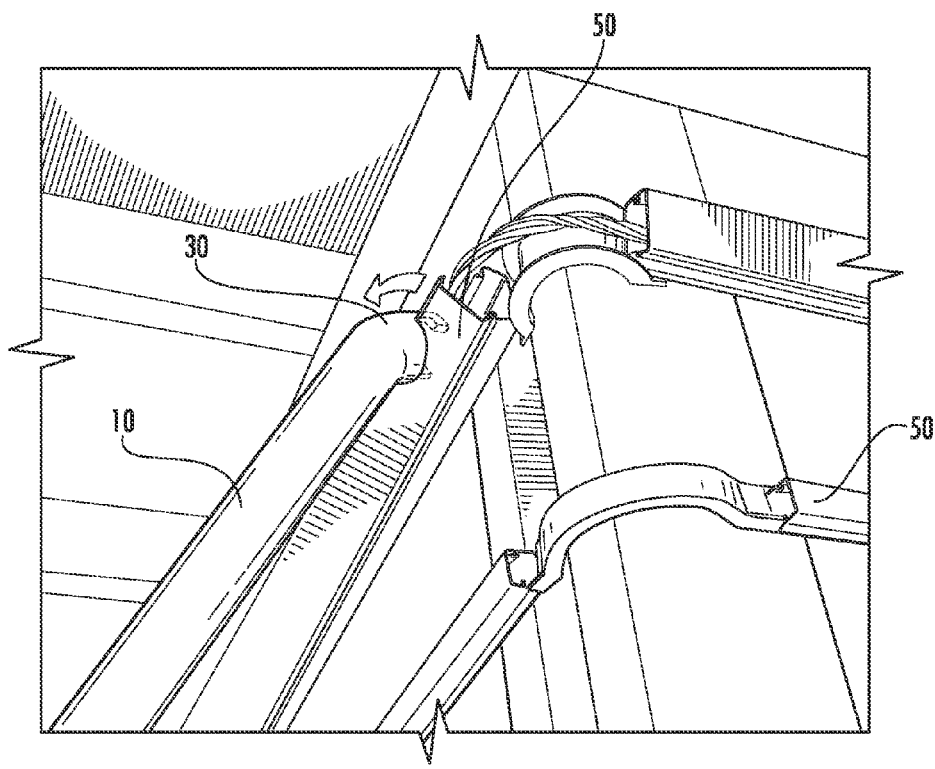
FIGS. 7-14 show an explanatory method of using the tool of FIG. 1 for placing a cable assembly into the molding.

On the other hand, using tool 10 allows quick and easy installation of cable 60 into molding 50. An explanatory method of installing cable 60 using tool 10 is discussed below with reference to FIGS. 7-14. First, the molding 50 is opened from the closed position so that a cable may be inserted into the same. Molding 50 may be opened by hand or by using tool 10. As shown in FIG. 7, the second end 30 of tool 10 may be used for opening molding 50. Specifically, tabs 32 on the second end 30 of tool 10 engage a lip of molding 50, thereby allowing the craft to quickly open the molding 50 by pulling downward and the pushing the handle slightly forward as represented by the arrow. Moreover, tool 10 allows the craft to open molding 50 along its length by sliding the second end 30 of tool 10 still engaging the lip of the molding, thereby opening the same as desired. The tool is especially advantageous where the molding 50 is located overhead since the craft can easily and quickly open molding 50 without the use of a ladder.

Figure 8:
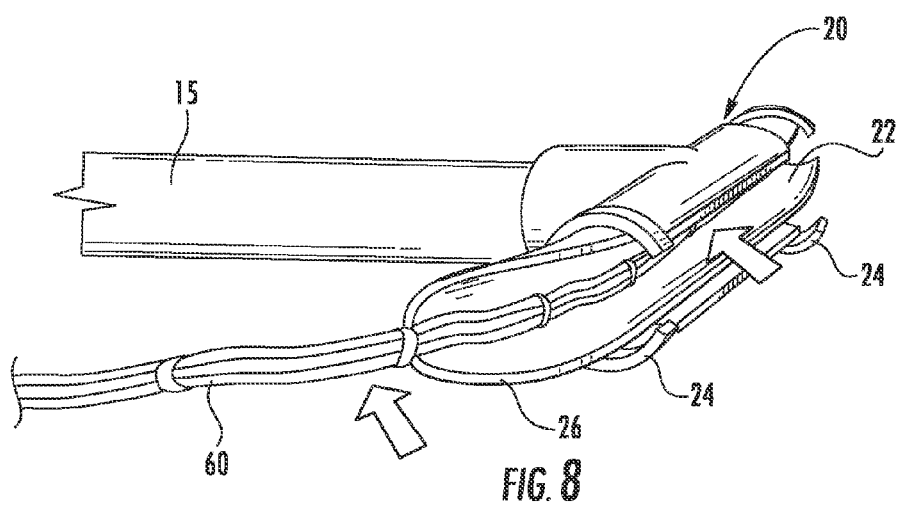
Figure 9:
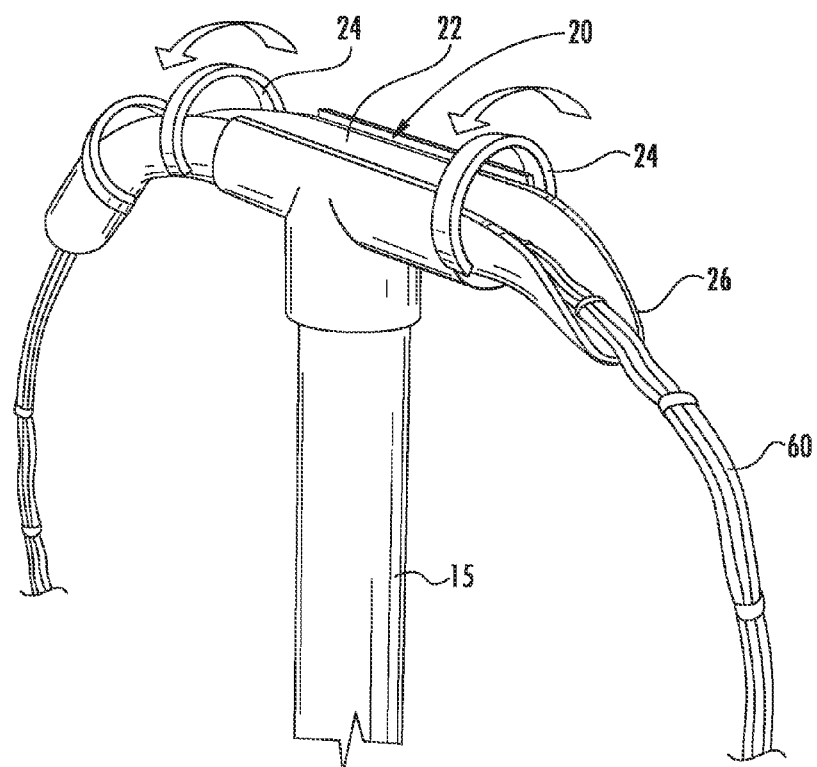
Figure 10:
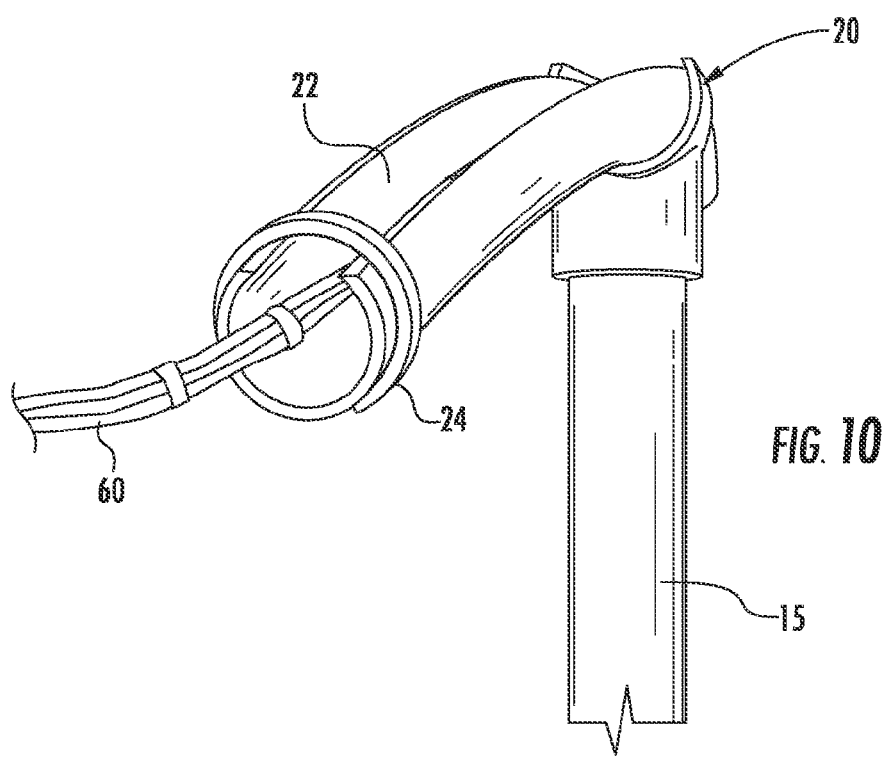

Next, a portion of cable 60 is positioned within tool 10 as depicted in FIGS. 8-10. FIG. 8 shows tool 10 with the closing devices 24 in the open position, thereafter cable 60 can be inserted into trough 22 as represented by the arrows. Next, FIG. 9 shows closing devices 24 being rotated to a closed position as represented by the arrows, thereby securing cable 60 within trough 22 of tool 10 as shown. FIG. 10 shows a view with the cable exiting the rear end of the laying chute 22. Simply stated, the closing devices are moved to the open position so that a portion of the cable may be placed in the laying chute 22 and then the closing devices 24 are closed for retaining cable 60 in the laying chute 22.

Once cable 60 is secured within tool 10 as shown in FIG. 10 it may be installed into the molding or other like structure. First, a portion of the tool 10 is placed into the molding thereby spreading apart the same so that the cable may be easily inserted therein. Thereafter, the tool 10 with a portion of cable 60 therein is moved along the molding to place the cable into the same. When the end of the run is reached, the closing devices 24 are opened to release cable 60 from the tool 10.

Figure 11:
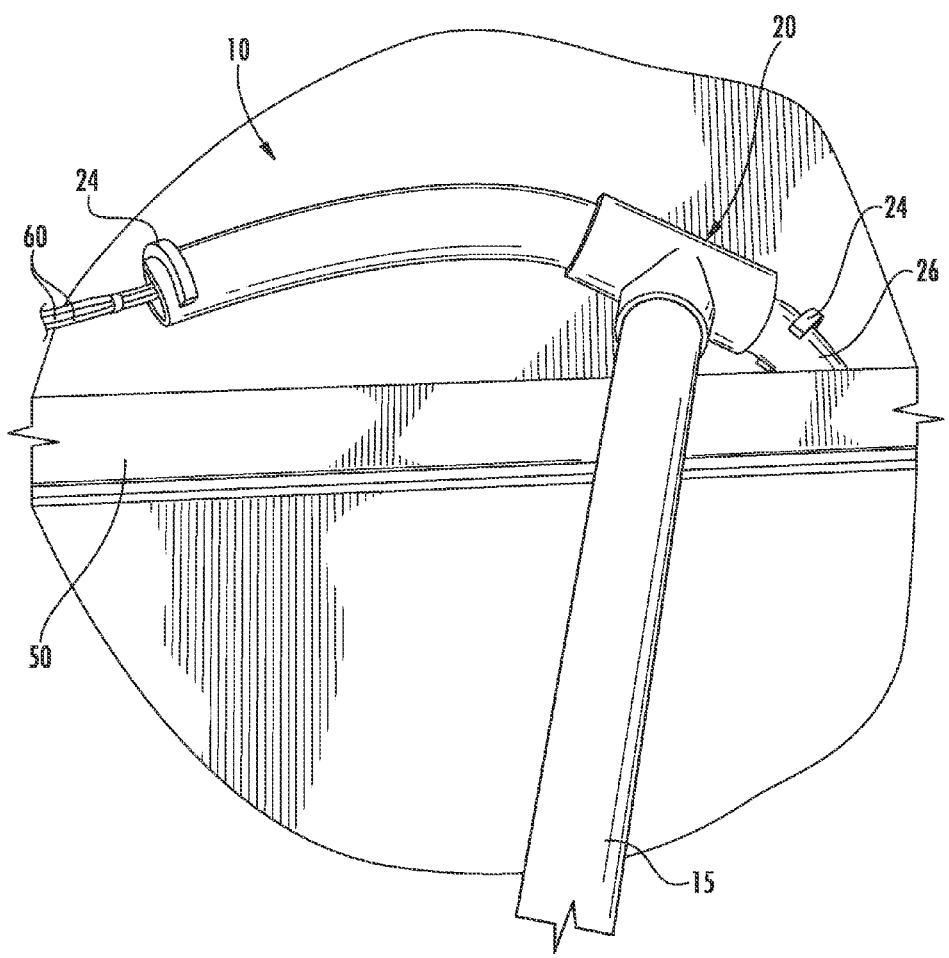
Figure 12:
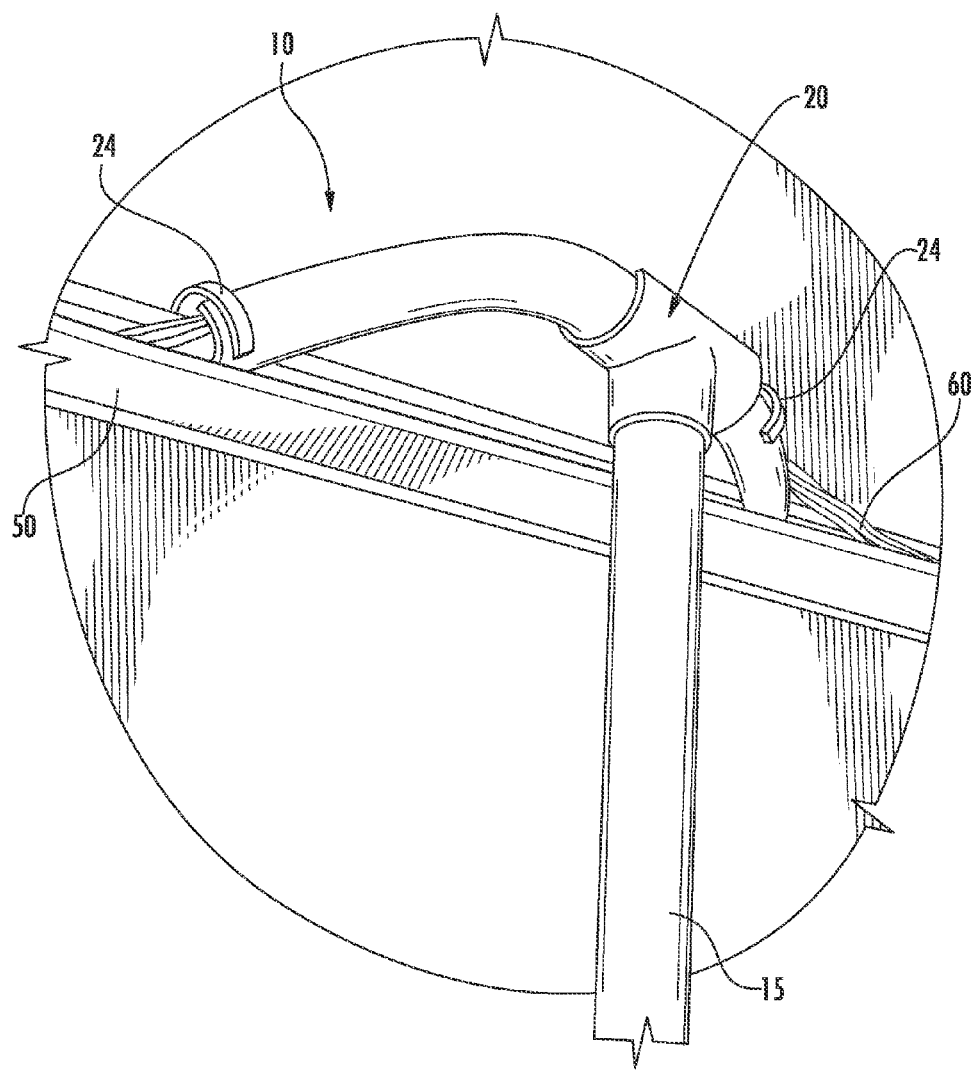
Figure 13:
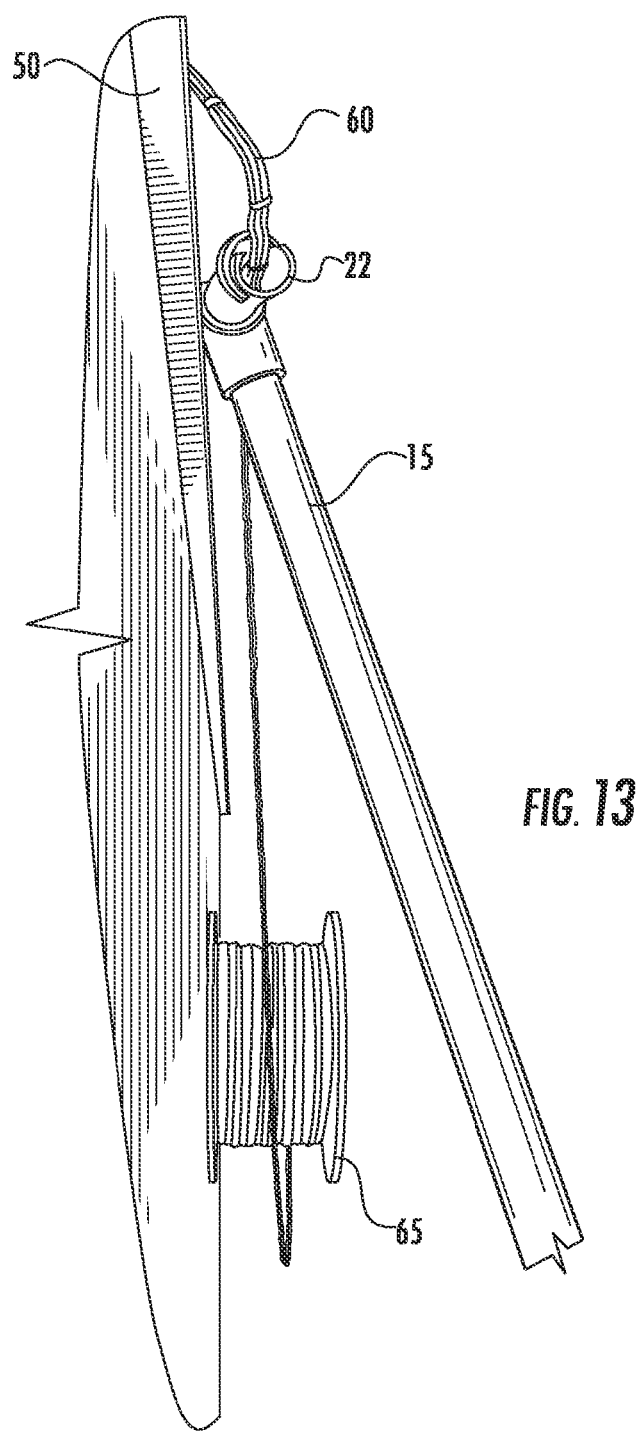

Illustratively, FIGS. 11-13 depict tool 10 being used for placing cable 60 into molding 50. FIGS. 11 and 12 show the step of inserting a portion of tool 10 into molding 50, thereby opening/spreading molding 50 so that cable 60 may be placed into the same when tool 50 is moved along the same. More specifically, FIG. 11 shows snout 26 of tool being positioned in the groove of molding 50 for opening/spreading the same and allowing placement of the cable therein and FIG. 12 shows the other side of the first end 20 also being positioned within the groove of the molding 50. Tool 10 is then moved toward a cable reel 65 that is paying-off cable 60 while one or more portions of tool 10 remain in the groove of molding 50 as shown in FIG. 13, thereby guiding cable 60 into the molding 50. In other words, the tool 10 is moved along the length of the molding to place the cable 60 therein. Additionally, the craft may pull on the tool 10 to open and slide the tool along the molding 50.

Figure 14:
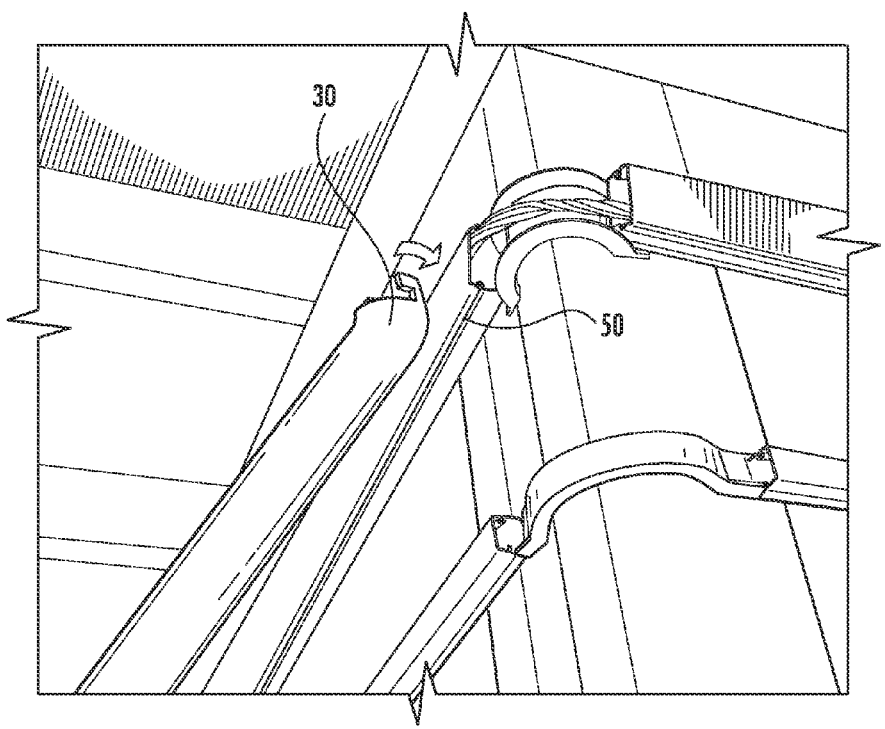

Once the cable is inserted into the channel of the molding, then the molding can be secured to the closed position. FIG. 14 depicts molding 50 being closed using the second end 30 of tool 10. By way of example, tabs 32 on the second end 30 of tool 10 are positioned on molding 50 to gently pull down and then pushing the open side of molding 50 to a closed position so the locking features of molding 50 engage. Thereafter, the backside of the second end 30 may be used to push molding 50 to verify that it is properly closed as shown.

Figure 15:
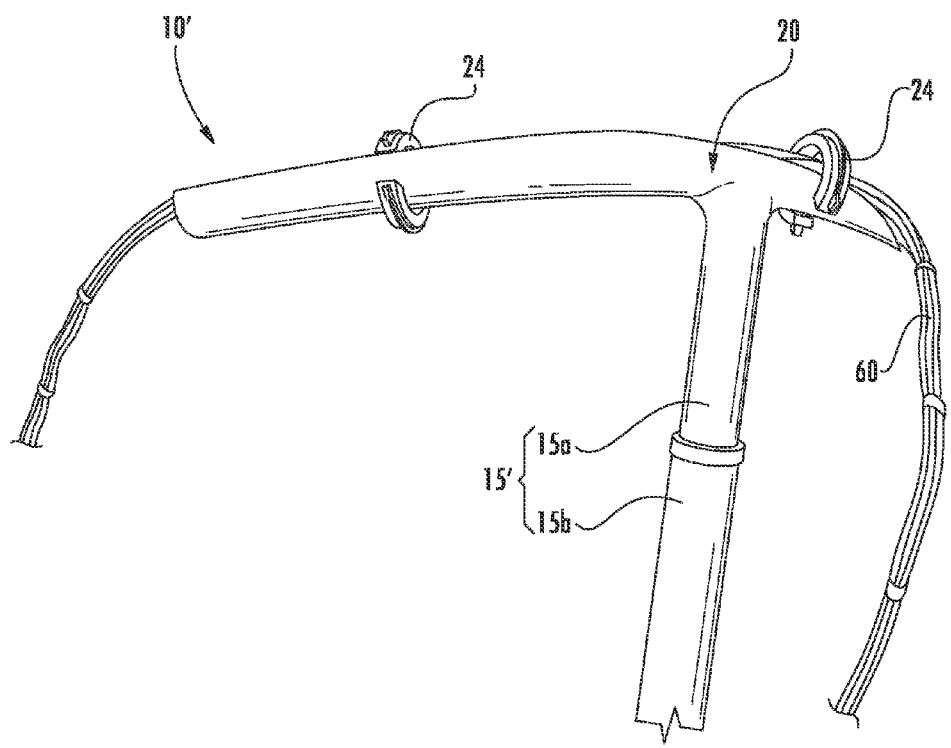
FIGS. 15 and 16 are various views of a variation of the tool in FIG. 1.
Figure 16:
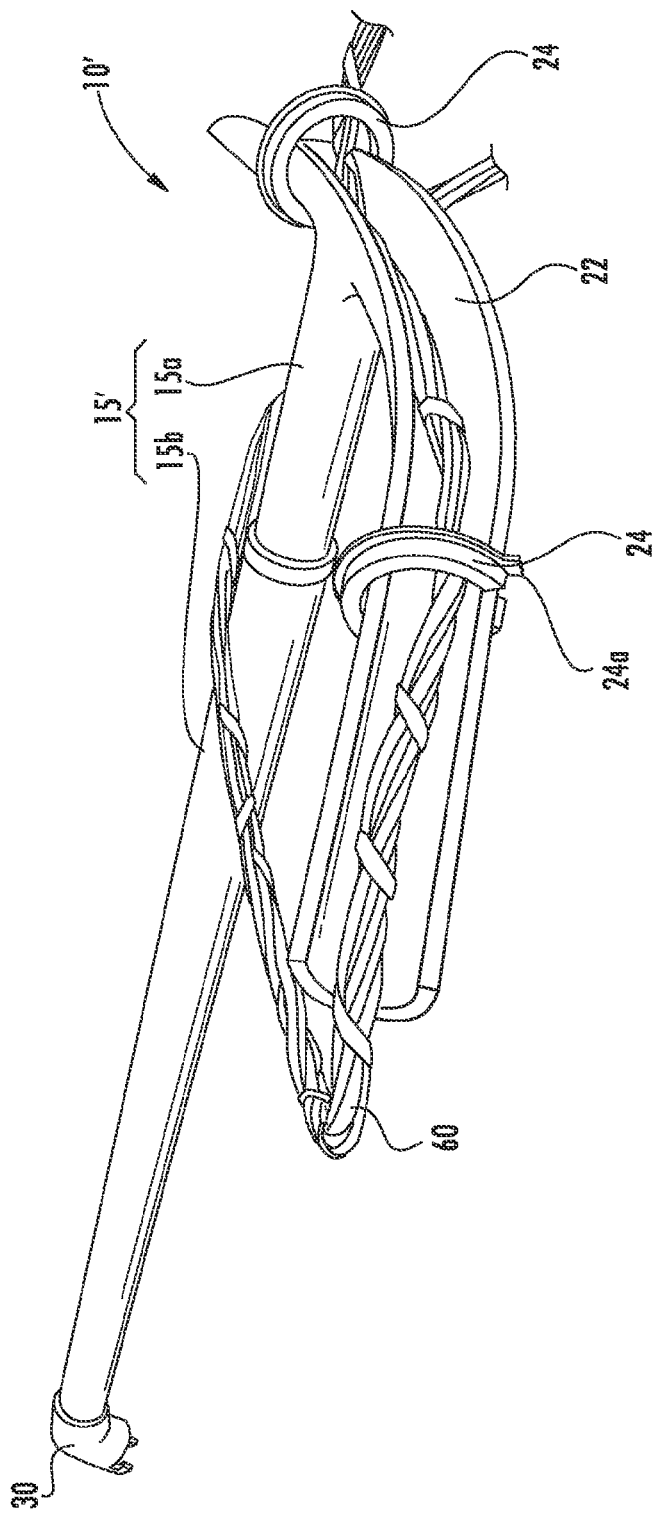

FIGS. 15 and 16 are various views of a variation of tool 10. Specifically, FIGS. 15 and 16 depict a tool 10' having a handle with an adjustable length such as a telescoping handle 15' for adjusting the length of tool 10'. Thus, the craft can adjust the length of the tool to suit the height of the craftsman and/or the height of the molding. For instance, telescoping handle 15' includes a first portion 15a and a second portion 15b that are slidable relative to each other for adjusting the length of tool 10'. In this embodiment, the first portion 15a fits into the second portion 15b and can be locked in position using a lock collar (not numbered), pins, or other suitable structure. In other variations, the handle of the tool can have a gripping portion or can have different end portions that may be attached to the handle so the tool may be used with other sizes and/or types of molding.

Although preferred embodiments and specific examples were illustrated and described herein, it will be readily apparent to those of ordinary skill in the art that other embodiments and examples can perform similar functions and/or achieve like results. All such equivalent embodiments and examples are within the spirit and scope of the present disclosure and are intended to be covered by the appended claims. It will also be apparent to those skilled in the art that various modifications and variations can be made to the embodiments shown. Thus, it is intended that the disclosure and/or claims cover the modifications and variations.

We claim:

1. A method of inserting one or more cables into a molding, including the steps of:
   providing a tool having a laying chute;
   inserting one or more cables into the laying chute of the tool;
   moving one or more closing devices on the tool for keeping the cable within the laying tool;
   inserting a portion of the tool into the molding; and
   moving the tool along the length of the molding to install the cable into the molding.

2. The method of claim 1, further including the step of opening the molding with the tool.

3. The method of claim 1, further including the step of closing the molding with the tool.

4. The method of claim 1, the step of inserting a portion of the tool including the step of inserting a portion of the snout into the molding.

5. The method of claim 1, further including the step of adjusting the length of the handle.

* * * * *